United States Patent Office 3,366,650
Patented Jan. 30, 1968

3,366,650
TETRA- AND PENTA-FLUORO-PHENYL- AND PHENYLALKYL - BIGUANIDES AND SALTS THEREOF
Jack Bernstein, New Brunswick, and Harry L. Yale, Metuchen, N.J., assignors to E. R. Squibb & Sons, Inc., New York, N.Y., a corporation of Delaware
No Drawing. Filed Oct. 7, 1965, Ser. No. 493,873
13 Claims. (Cl. 260—343.7)

This invention relates to new compounds of the formula (I)

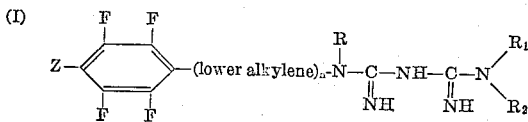

and to acid addition salts thereof.

In Formula I, R, $R_1$ and $R_2$ each is hydrogen, lower alkyl or phenyl-lower alkyl, Z is hydrogen or fluoro, and $n$ is 0 or 1. The lower alkyl groups represented by the symbols R, $R_1$ and $R_2$ include straight and branched chain aliphatic groups such as methyl, ethyl, propyl, isopropyl, butyl, isobutyl, t-butyl, amyl, isoamyl and the like. The lower alkyl group in the phenyl-lower alkyl substituent represented by the symbols is of the same character, benzyl being preferred. The lower alkylene groups in the formula are straight or branched divalent aliphatic hydrocarbon groups. The two carbon chain is preferred.

The new compounds of this invention may be produced by a variety of methods. The hydrochloride of a primary or secondary amine, containing the fluorinated phenyl residue, is fused with dicyandiamide or a substituted dicyandiamide (substituted cyanoguanidine) and the substituted biguanide hydrochloride recovered from the reaction mixture. Alternatively, the hydrochloride of the primary or secondary amine is reacted with sodium dicyanamide in aqueous butanol to yield the fluorinated phenyl substituted dicyandiamide, which is then fused with the hydrochloride of the appropriate primary or secondary amine.

Suitable starting amines for compounds of Formula I include, for example, pentafluoroaniline, pentafluorobenzylamine, pentafluorophenethylamine, 1-pentafluorophenyl-2-propylamine, 2,3,5,6-tetrafluoroaniline, 2,3,5,6-tetrafluorobenzylamine, 2,3,5,6-tetrafluorophenethylamine, N-methylpentafluoroaniline, N-ethylpentafluoroaniline, N-methylpentafluorobenzylamine, N - methylpentafluorophenethylamine, N-ethylpentafluorophenethylamine, N-methyl-2,3,5,6-tetrafluoroaniline, N-methyl-2,3,5,6-tetrafluorobenzylamine, N-methyl-2,3,5,6-tetrafluorophenethylamine, among others.

These amines, may be prepared by the reaction of hexafluorobenzene or pentafluorobenzene with ammonia or a primary amine such as methylamine or ethylamine. Those amines, in which the fluorinated phenyl residue is attached to an alkyl group, may be prepared by the reduction of the corresponding nitrile or amide, using lithium aluminium hydride as the reducing agent. They may also be prepared, when appropriate by the reduction of the corresponding oxime, using Raney nickel as the catalyst.

Suitable dicyandiamides (cyanoguanidines) for the preparation of compounds of Formula I include dicyandiamide, 3-cyano-1-methylguanidine, 3-cyano-1-ethylguanidine, 3-cyano-1-propylguanidine, 3-cyano-1-isobutylguanidine, 3-cyano-1,1-dimethylguanidine, 3-cyano-1,1-diethylguanidine and 3-cyano-1-methyl - 1 - benzylguanidine, among others.

The preferred compounds of this invention are those wherein $n$ is one, the lower alkylene group has two carbon atoms and R, $R_1$ and $R_2$ are hydrogen and the hydrochloric acid salts thereof.

The bases of Formula I form acid addition salts with a variety of inorganic and organic acids, such salts include, for example, the hydrohalides, e.g., hydrochloride, hydrobromide, etc., sulfate, phosphate, nitrate, sulfonates, e.g., camphorsulfonate, benzenesulfonate, toluenesulfonate, etc., citrate, oxalate, ascorbate, acetate, tartrate, salicylate and the like. It is frequently most convenient to isolate the compound by forming the acid salt and precipitating it in a medium in which it is insoluble. The free base may then be obtained by neutralization.

The compounds of this invention are hypoglycemic agents which are effective in lowering blood sugar contents in mammals. Some are particularly noteworthy in their long duration of action. They may be administered orally in the form of tablets, capsules or elixirs or the like by incorporating the appropriate dosage (e.g., 10 to 250 mg.) of the base of Formula I or a physiologically acceptable acid-addition salt, such as the hydrochloride, in a conventional vehicle together with excipients, lubricants, preservatives, stabilizers and the like, as required according to accepted pharmaceutical practice.

The following examples are illustrative of the invention, all temperatures being in degrees centigrade.

*Example 1.—Preparation of $N_1$-(pentafluorophenyl) biguanide hydrochloride*

A mixture of 22 grams of pentafluoroaniline hydrochloride and 8.4 grams of dicyandiamide is heated gradually in an oil bath with stirring until a clear melt is obtained. The mixture is heated at this temperature for about one hour and is then cooled. The crude product is crystallized from ethanol to yield the desired $N_1$-(pentafluorophenyl)biguanide hydrochloride.

Following this same procedure but substituting an equivalent amount of the indicated amine hydrochloride for the pentafluoroaniline hydrochloride, the corresponding biguanide is obtained. Thus, if 2,3,5,6-tetrafluoroaniline hydrochloride is substituted for the pentafluoroaniline hydrochloride, there is obtained $N_1$-(2,3,5,6-tetrafluorophenyl)biguanide hydrochloride, and if N-methylpentafluoroaniline hydrochloride is substituted for the pentafluoroaniline hydrochloride, there is obtained $N_1$-methyl-$N_1$-(pentafluorophenyl)biguanide hydrochloride.

*Example 2.—Preparation of $N_1$-(pentafluorophenethyl) biguanide hydrochloride*

A mixture of 24.8 grams of pentafluorophenethylamine hydrochloride and 8.4 grams of dicyandiamide is heated gradually in an oil bath with stirring until a clear melt is obtained. The mixture is heated at this temperature for about one hour and is then cooled. The crude product is crystallized from ethanol to yield the desired $N_1$-(pentafluorophenethyl)biguanide hydrochloride.

Similarly, by substituting an equivalent amount of the indicated cyanoguanidine for the dicyandiamide in the procedure of Example 2, there is obtained the corresponding substituted biguanide hydrochloride.

| Cyanoguanidine | $N_1$ (pentafluorophenethyl) biguanide·HCl |
|---|---|
| $R_1$\\N—C—NH—CN /  ‖ /$R_2$  NH | F-C₆F₄-CH₂CH₂-N(H)-C(=NH)-NH-C(=NH)-N(R₁)(R₂)·HCl |
| Example 3: $R_1=CH_3$, $R_2=H$<br>Example 4: $R_1=C_2H_5$, $R_2=H$<br>Example 5: $R_1=C_6H_5CH_2$, $R_2=H$<br>Example 6: $R_1=CH_3$, $R_2=CH_3$<br>Example 7: $R_1=C_2H_5$, $R_2=C_2H_5$ | $R_1=CH_3$, $R_2=H$<br>$R_1=C_2H_5$, $R_2=H$<br>$R_1=C_6H_5CH_2$, $R_2=H$<br>$R_1=CH_3$, $R_2=CH_3$<br>$R_1=C_2H_5$, $R_2=C_2H_5$ |

*Example 8.—Preparation of $N_1$-(pentafluorophenethyl)-$N_5$-benzyl-$N_5$-methylbiguanide hydrobromide*

(a) *Preparation of 1-cyano-3-(pentafluorophenethyl) guanidine.*—A mixture of 124 grams of pentafluorophenethylamine hydrochloride and 55 grams of sodium dicyanamide in one liter of n-butanol and 80 ml. of water is stirred and heated under reflux for 7 hours. The sodium chloride is removed by filtration and the filtrate concentrated to dryness under reduced pressure. The residue is triturated with water and filtered to yield the desired 1-cyano-3-(pentafluorophenethyl)guanidine.

(b) *Preparation of $N_1$-(pentafluorophenethyl)-$N_5$-benzyl-$N_5$-methylbiguanide hydrobromide.*—A mixture of 27.8 grams of 1-cyano-3-(pentafluorophenethyl)guanidine and 20.2 grams of N-methylbenzylamine hydrobromide is heated gradually, with stirring, in an oil bath. The bath temperature is raised gradually until a clear melt is obtained and the heating is continued for one hour. The reaction mixture is then cooled and the residue crystallized from aqueous ethanol to yield the desired $N_1$-(pentafluorophenethyl) - $N_5$ - benzyl - $N_5$ - methylbiguanide hydrobromide.

*Example 9.—Preparation of $N_1$-(pentafluorophenethyl) biguanide*

A solution of 10 grams of $N_1$- pentafluorophenethyl) biguanide hydrochloride in 250 ml. of water is cooled and made alkaline by the addition of an equivalent amount of sodium hydroxide solution. The mixture is then allowed to cool at 5° and the precipitated solid is filtered. The solid is then recrystallized from aqueous ethanol to yield the desired $N_1$-(pentafluorophenethyl) biguanide.

*Example 10.—Preparation of $N_1$-(pentafluorophenethyl) biguanide oxalate*

A solution of 5 grams of $N_1$-(pentafluorophenethyl) biguanide in warm ethanol is treated with an equivalent amount of oxalic acid in ethanol. Anhydrous ether is added to the cooled mixture and the precipitated solid is filtered to yield the desired $N_1$-(pentafluorophenethyl) biguanide oxalate.

*Example 11.—Preparation of $N_1$-(2,3,4,5,6-pentafluoro-β-ethylphenethyl)-$N_1$-ethylbiguanide hydrochloride*

(a) *Preparation of α-(pentafluorophenyl)butyrylnitrile.*—To a suspension of 3.9 grams of sodamide in 100 ml. of dry toluene is added a solution of 20.7 grams of pentafluorophenylacetonitrile in 50 ml. of dry toluene. The mixture is heated gradually to reflux under nitrogen and maintained at reflux for one hour. The mixture is then cooled to 10° and 10.9 grams of ethyl bromide is added at 20–25°. After the addition is completed, the reaction mixture is warmed on a steam bath for two hours. It is then cooled and about 100 ml. of water is added. The toluene layer is separated and washed thoroughly with water. The solution is dried over magnesium sulfate and the toluene removed under reduced pressure. The residue is fractionally distilled to yield the desired α-(pentafluorophenyl)butyrylnitrile.

(b) *Preparation of α- (pentafluorophenyl)butyric acid.*—A mixture of 23.5 grams of α-(pentafluorophenyl) butyrylnitrile, 24 ml. of concentrated sulfuric acid, 24 ml. of acetic acid and 24 ml. of water is refluxed for one hour and then poured into water. The precipitated solid is filtered off and dissolved in sodium carbonate solution. The sodium carbonate solution is filtered and acidified to yield the desired α-(pentafluorophenyl)butyric acid.

(c) *Preparation of α - (pentafluorophenyl)butyryl chloride.*—A solution of 25.4 grams of α-pentafluorophenyl)butyric acid in 75 ml. of thionyl chloride is refluxed for two hours. The excess thionyl chloride is removed by distillation and the residue fractionated at 5 mm. to yield the desired α-(pentafluorophenyl(butyryl chloride.

(d) *Preparation of N - ethyl - α - (pentafluorophenyl) butyramide.*—To a solution of 13.6 grams of α-(pentafluorophenyl)butyryl chloride in 250 ml. of anhydrous ether is added slowly with vigorous stirring a solution of 10 grams of ethylamine in anhydrous ether, while the mixture is cooled in an ice bath. The mixture is stirred for 30 minutes after the addition is completed and is then treated with 200 ml. of water. The ether layer is separated and the aqueous layer extracted again with ether. The ether extracts are combined, dried over anhydrous magnesium sulfate, and concentrated under reduced pressure. The residue from this concentration is the desired N-ethyl-α-(pentafluorophenyl)butyramide.

(e) *Preparation of N-β-diethyl-(pentafluorophenethyl)-amine hydrochloride.*—A solution of 10 grams of N-ethyl-α-(pentafluorophenyl)-butyramide in anhydrous ether is added slowly, with vigorous stirring, to a suspension of lithium aluminum hydride in anhydrous ether. After the addition is completed, the reaction mixture is heated to gentle reflux for 4 hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous potassium carbonate, the solution is filtered and treated with a solution of hydrogen chloride in anhydrous ether. The precipitated solid is filtered and crystallized from a mixture of absolute ethanol and anhydrous ether to yield the desired N,β-diethyl-(pentafluorophenethyl)amine hydrochloride.

(f) *Preparation of $N_1$-(2,3,4,5,6-pentafluoro-β-ethylphenethyl)-$N_1$-ethylbiguanide hydrochloride.*—Following the procedure of Example 1, but substituting an equivalent amount of the N,β-diethyl-(pentafluorophenethyl) amine hydrochloride for the pentafluoroaniline hydrochloride, there is obtained $N_1$-(2,3,4,5,6-pentafluoro-β-ethylphenethyl)-$N_1$-ethylbiguanide hydrochloride.

*Example 12.—Preparation of $N_1$-(2,3,4,5,6-pentafluoro-β - ethylphenethyl)-$N_1$-ethyl-$N_5$,$N_5$-dimethylbiguanide hydrochloride*

By following the procedure of Example 11, but substituting an equivalent amount of 1-cyano-3,3-dimethylguanidine for the dicyandiamide in Part f, there is obtained $N_1$ - (2,3,4,5,6 - pentafluoro-β-ethylphenethyl)-$N_1$-ethyl-$N_5$,$N_5$-dimethylbiguanide hydrochloride.

*Example 13.—Preparation of $N_1$-(pentafluorophenethyl)-biguanide hydrochlide*

Following the procedure of Example 11, but substituting pentafluorophenacetyl chloride for the α-(pentafluorophenyl)butyryl chloride and ammonia for the ethyl amine in Part d, there is obtained $N_1$-(pentafluorophenethyl)-biguanide hydrochloride.

Similarly, by following the procedure of Example 11, but substituting pentafluorobenzoyl chloride and 3-(pentafluorophenyl)propionyl chloride for the α-(pentafluorophenyl)butyryl chloride and ammonia for the ethyl amine, there is obtained $N_1$-(pentafluorobenzyl)biguanide hydrochloride and $N_1$-(3-[pentafluorophenyl]propyl)biguanide hydrochloride.

What is claimed is:

1. A compound of the formula

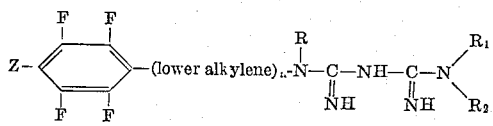

wherein R, $R_1$ and $R_2$ each is hydrogen, lower alkyl or phenyl-lower alkyl, Z is hydrogen or fluoro and $n$ is 0 or 1, and acid addition salts thereof.

2. A compound of the formula

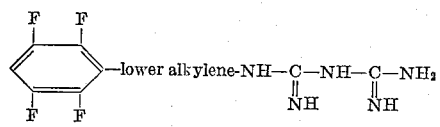

3. Acid addition salt of a compound of claim 2.
4. A compound of the formula

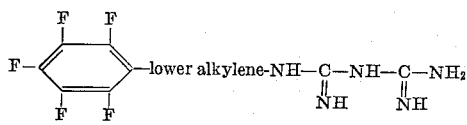

5. Acid addition salt of a compound of claim 4.
6. A compound of the formula

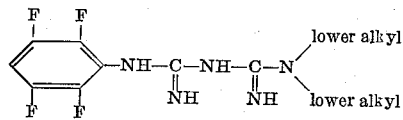

7. A compound of the formula

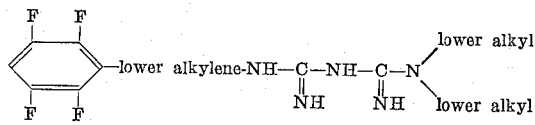

8. A compound of the formula

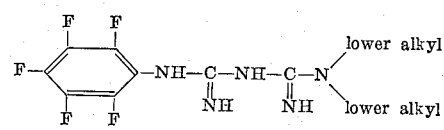

9. A compound of the formula

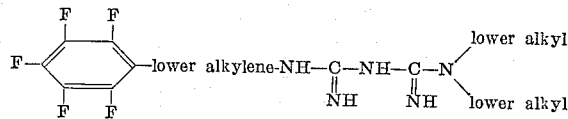

10. A compound of the formula

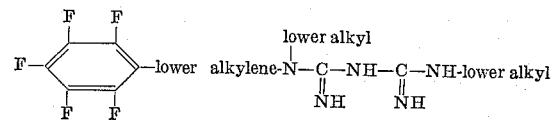

11. $N_1$-(pentafluorophenyl)biguanide.
12. $N_1$-(pentafluorophenethyl)biguanide.
13. $N_1$ - (pentafluorophenethyl)-$N_5$-benzyl-$N_5$-methylbiguanide.
14. $N_1$-(2,3,5,6-tetrafluorophenyl)biguanide.
15. $N_1$-(pentafluorobenzyl)biguanide.
16. $N_1$ - (2,3,4,5,6 - pentafluoro-β-ethylphenethyl)-$N_1$-ethylbiguanide.
17. $N_1$ - (2,3,4,5,6 - pentafluoro-β-ethylphenethyl-$N_1$-ethyl-$N_5$,$N_5$-dimethylbiguanide.
18. $N_1$-(2,3,5,6-tetrafluorophenyl)biguanide.

References Cited

UNITED STATES PATENTS 2,961,377  11/1960  Shapiro et al. _____ 167—65

CHARLES B. PARKER, *Primary Examiner.*

R. V. HINES, *Assistant Examiner.*